G. W. SHADE.
HORSE HAY FORK.
No. 104,891. Patented June 28, 1870.
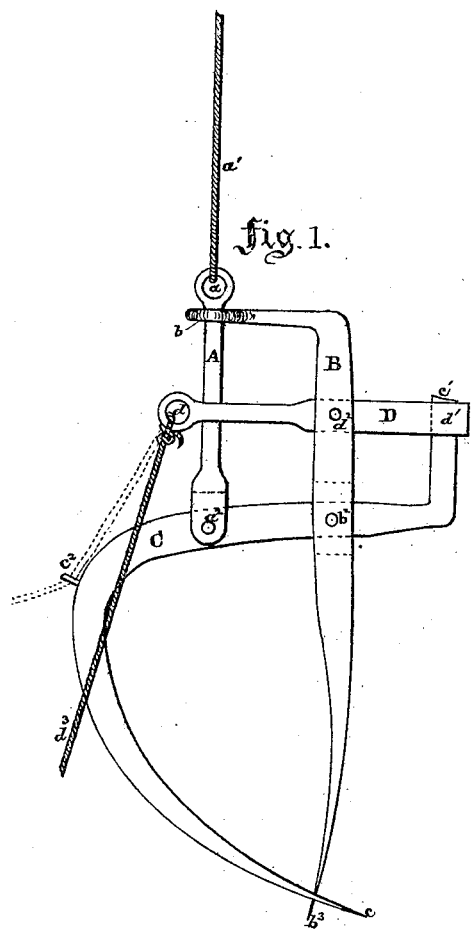
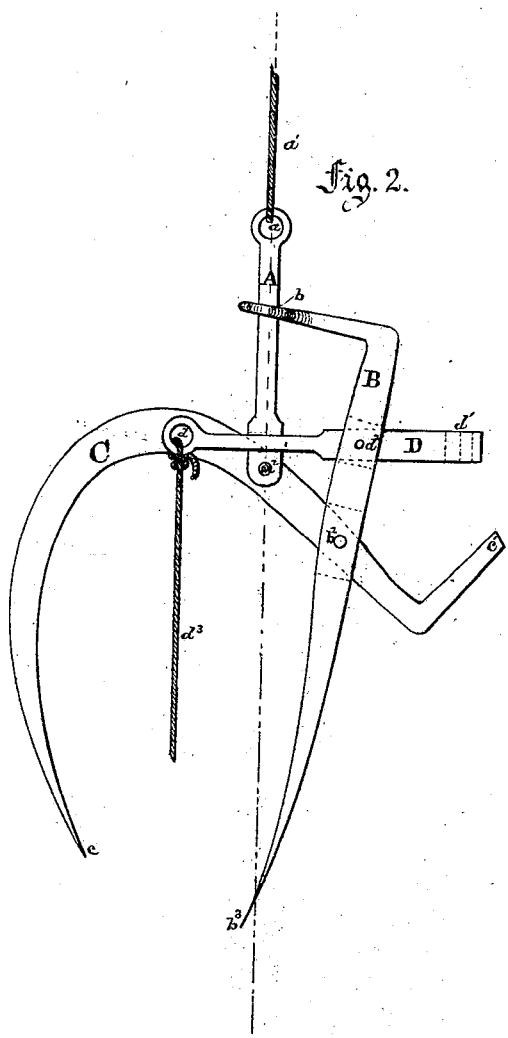
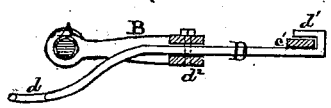
Witnesses
W. M. Rollins
J. Wiles
Inventor
J. H. A. McPherson
Atty for
George W. Shade

United States Patent Office.

GEORGE W. SHADE, OF SHIPPENSBURG, PENNSYLVANIA.

Letters Patent No. 104,891, dated June 28, 1870.

IMPROVEMENT IN HORSE HAY-FORKS.

The Schedule referred to in these Letters Patent and making part of the same.

*To all whom it may concern:*

Be it known that I, GEORGE W. SHADE, of Shippensburg, county of Cumberland and State of Pennsylvania, have invented a new and useful Improvement in Hay-Elevators; and I do hereby declare that the following is a full and exact description thereof, reference being had to the accompanying drawings, and to the letters of reference marked thereon, wherein—

Figure 1 represents the invention with the points closed.

Figure 2 represents the same with the points open.

Figure 3, a plan of the trip-lever.

The nature of this invention consists in the construction and arrangement of the several parts, as will be hereafter described.

To enable others skilled in the art to make and use my invention, I will proceed to describe its construction and operation.

I construct the several parts of the elevator of steel or iron, or both metals, A being the stem; B, the spear; C, the grapple; D, the trip-lever; which constitute the several pieces.

The stem A has at its upper end an eye, $a$, to which is fastened the elevating-cord $a^1$.

At its lower end it is furnished with jaws, which straddle the grapple C, and to which it is pivoted by a bolt, $a^2$, working freely in it.

The spear B at its upper end is turned at right angles, and has an eye at $b$, through which the stem A is inserted and slides freely upon it.

The lower end of the spear is made tapering to enter the pile of hay, and is curved inwardly.

Through B, at $d^2$ and $b^2$, are mortises for the reception of the trip-lever D and grapple C, both of which are pivoted freely on bolts.

Grapple C is turned at its upper end at right angles, and at its lower end bent in an elliptical curve, so that, when in action to raise the weight, the point $c$ crosses the point $b^3$ several inches, as represented in fig. 1.

The grapple is so pivoted on the lower end of the stem A that, when the catch of the trip-lever is released, it will hang in the position shown in fig. 2 much more than it will readily open to discharge the hay, when the load is an additional force to open the grapple.

It is also pivoted through the spear B at $b^2$, so that, when the load is to be discharged, the spear drops down from the first position in fig. 1, and takes the sloping direction in fig. 2, to aid the rapid discharge of the load.

The trip-lever D, as shown in fig. 3, is bent at right angles, and rebent, as at $d^1$, to act as a catch for the upper end $c'$ of the grapple C.

It is pivoted to the spear B at $d^2$, and is curved outwardly toward its handle, where it has an eye, $d$, for fastening the trip-cord $d^3$, which cord may be led off in any suitable direction, or it may be passed through an eye upon the convex side of the grapple, which would insure the release of the load by forcing the grapple and the trip-lever together.

In the first position, fig. 1, the elevator is represented as closed upon its load. The spear is strongly braced by the eye $b$ being firmly set against the eye-ring at $a$. The trip-lever D is firmly holding the upper end of the grapple by its catch $d^1$, thus holding the grapple against its load of hay, while the stem A is the connecting-link supporting the entire load at its point $a^2$, and no possible release can occur until the catch at $d^1$ is lifted from $c'$, which is readily effected by pulling down the cord $d^3$, when instantly the weight will throw outward the grapple into position second, in fig. 2, and the load will be discharged.

Having clearly explained the operation of my invention,

What I claim as new therein, and wish to secure by Letters Patent of the United States, is—

The combination and arrangement of the stem A, the spear B, the grapple C, and the trip-lever D, all constructed substantially as and for the purpose described.

GEORGE W. SHADE.

Witnesses:
SEBASTIAN SHOVER,
I. O. M. BUTTS.